United States Patent [19]

Takahashi

[11] Patent Number: 4,654,840
[45] Date of Patent: Mar. 31, 1987

[54] FRONT-LOADING DISC PLAYER WITH A HORIZONTALLY DISPOSED DISC SUPPORTING MEMBER AND A SWINGABLE TURNTABLE AND PICK-UP UNIT

[75] Inventor: Junji Takahashi, Tokorozawa, Japan

[73] Assignee: Pioneer Electronic Corporation, Tokyo, Japan

[21] Appl. No.: 674,665

[22] Filed: Nov. 26, 1984

[30] Foreign Application Priority Data

Nov. 24, 1983 [JP] Japan .......................... 58-181160[U]

[51] Int. Cl.$^4$ .................. G11B 17/04; G11B 25/04
[52] U.S. Cl. .................................. 369/75.2; 360/97; 360/96.5
[58] Field of Search .................. 360/105, 96.6, 97–99, 360/96.5; 369/75.1, 75.2, 77.1, 77.2, 213, 215, 264, 270, 271

[56] References Cited

U.S. PATENT DOCUMENTS

| | | | |
|---|---|---|---|
| 4,044,391 | 8/1977 | Takahashi | 360/105 |
| 4,099,209 | 7/1978 | Sander et al. | 360/96.5 |
| 4,351,009 | 9/1982 | Osada et al. | 360/105 |
| 4,507,771 | 3/1985 | Tanaka | 369/215 |
| 4,539,613 | 9/1985 | Suyama et al. | 360/97 |
| 4,578,787 | 3/1986 | Shimizu et al. | 369/264 |

FOREIGN PATENT DOCUMENTS

| | | | |
|---|---|---|---|
| 56-58169 | 5/1981 | Japan | 369/270 |
| 56-137561 | 10/1981 | Japan | 360/105 |
| 57-33466 | 2/1982 | Japan | 360/97 |

Primary Examiner—John H. Wolff
Assistant Examiner—Matthew J. Busson
Attorney, Agent, or Firm—Fleit, Jacobson, Cohn & Price

[57] ABSTRACT

A front-loading disc player of improved construction, having a disc supporting member which is mounted in a housing to be slidable between an externally protruding position for loading or unloading a recording disc and a position contained within the housing, for playing the disc contents, featuring a simplified mechanical configuration whereby the disc supporting member only moves along a single direction, i.e. substantially horizontally, with the turntable and pick-up unit being mounted together on a swinging member which is swung upward or downward to respectively engage or disengage the turntable from the recording disc supported on the disc supporting member.

7 Claims, 3 Drawing Figures

FRONT-LOADING DISC PLAYER WITH A HORIZONTALLY DISPOSED DISC SUPPORTING MEMBER AND A SWINGABLE TURNTABLE AND PICK-UP UNIT

BACKGROUND OF THE INVENTION

The present invention relates to a front-loading disc player, for playing recording discs such as digitally recorded audio discs or video discs, whereby a considerably simpler mechanical configuration is utilized than has been known in the prior art, so that the manufacturing cost of such a front-loading disc player can be made substantially lower than has hitherto been possible.

Digitally recorded audio discs and video discs, whose contents are read out by opto-electric or capacitance types of pick-up means, are coming into increasingly widespread use. There is an according requirement for producing equipment for playback of such discs which can be manufactured at low cost while providing high reliability. In particular, a front-loading type of player for such discs is desirable, since such a configuration enables the upper face of the player to be utilized effectively, e.g. to accommodate other equipment. However it has hitherto been difficult to manufacture a front-loading disc player for such recorded discs at low cost (by comparison with top-loading types of disc player) due to the relatively complex mechanism which is utilized in the prior art devices to load and unload discs from the player. More specifically, with such a prior art type of front-loading disc player, a supporting member, generally in the shape of a horizontally oriented tray having a central aperture, is arranged to be movable horizontally to a position protruding outward from an aperture in the disc player, in which a recorded disc can be placed in a specific portion of that disc supporting member, whereupon the disc supporting member can be pushed (or driven automatically) horizontally inward to be contained within the housing. The disc supporting member is then moved perpendicularly, e.g. lowered, such that the recording disc becomes supported and driven by a playing mechanism which is fixedly mounted within the housing. This playing mechanism basically comprising a motor-driven turntable which engages the central aperture of the recording disc, and pick-up means of optical or capacitance type. To unload a disc, the sequence of events described above is reversed, to leave the disc supporting member protruding from the housing.

With such a prior art arrangement, it is necessary to move the disc supporting member in two different directions (i.e. horizontally and vertically) in order to perform a disc loading or unloading operation, so that a relatively complex mechanism is required, thereby resulting in high manufacturing cost. There is therefore a requirement for an improved type of front-loading disc player whereby the overall mechanical configuration can be substantially simplified.

SUMMARY OF THE INVENTION

It is an objective of the present invention to provide a front-loading disc player which incorporates a simplified mechanism for loading and unloading recording discs. To attain this objective, such a front-loading disc player essentially comprises a housing having an aperture formed in a substantially vertically oriented face thereof, a disc supporting member which is shaped to support a recording disc and which is slidably mounted with respect to the housing such as to be movable between an outwardly protruding position, in which the disc supporting member extends outward from the housing through the aperture therein and in which a recording disc can be removed from or set upon the disc supporting member, and an inward position in which the disc supporting member with a recording disc supported thereon is completely enclosed within the housing. The player further comprises a swinging member having a motor-driven turntable and pick-up means mounted thereon, which is pivoted at one end about pivot means mounted in the housing such that the turntable and pick-up means can be swung to a downward position, in which (with the disc supporting member in the inward position thereof) the turntable is completely disengaged from a recording disc supported by the disc supporting member, and to an upward position, in which the turntable engages with and supports the recording disc and in which the pick-up means are positioned relative to the recording disc thus supported such that the recorded contents of the recording disc can be read out thereby, as the disc is rotated by the turntable. Thus with such a front-loading disc player, unloading is performed simply by swinging the swinging member to its downward position, then pulling (e.g manually) the disc supporting member to protrude outward from the housing, whereupon the recording disc can be changed. Loading is then performed by pushing the disc supporting member into the housing to its inward position, then swinging the swinging member upward to thereby engage the recording disc with the turntable (i.e. to separate the recording disc from the disc supporting member).

Since it is only necessary to move the disc supporting member along a single direction (i.e. substantially horizontally, inward and outward with respect to the housing) the overall mechanical configuration of such a front-loading disc player can be made extremely simple, and hence inexpensive to manufacture, as will be made clear by the embodiment of the present invention described hereinafter.

DESCRIPTION OF THE PREFERRED EMBODIMENTS

Figure 1:
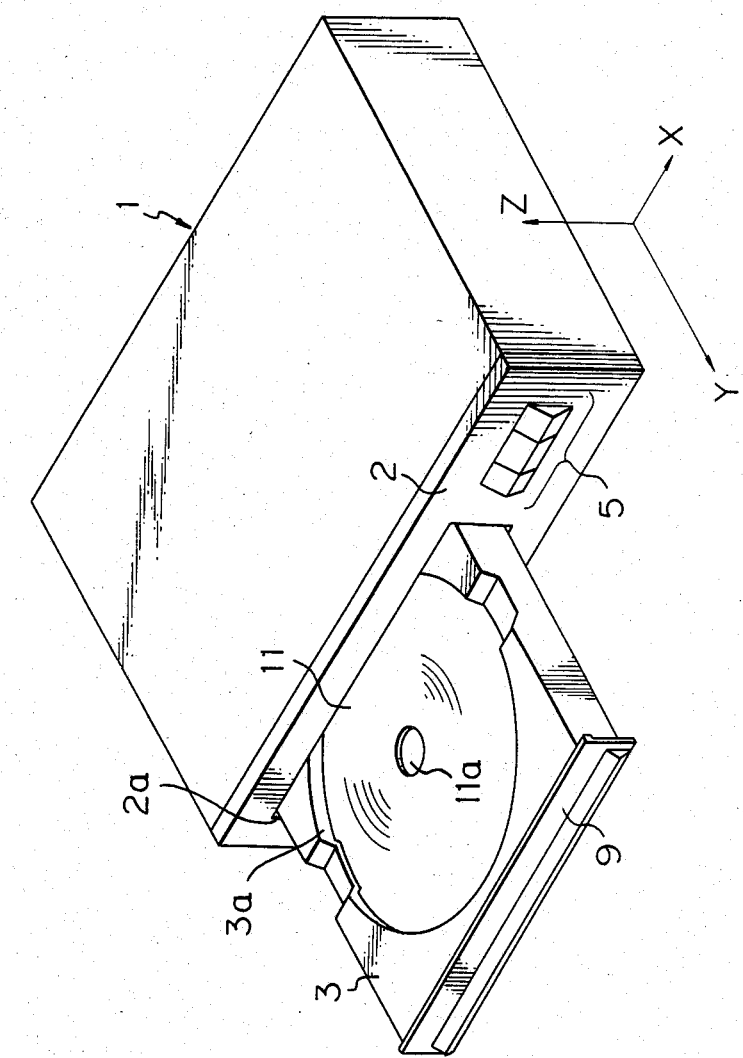
FIG. 1 is an oblique external view of an embodiment of a front-loading disc player according to the present invention.

Referring first to FIG. 1, an oblique external view of an embodiment of a front-loading disc player according to the present invention is shown. Numeral 1 denotes a housing, which is of basically rectangular shape having a vertically oriented front panel 2 in which an elongated rectangular aperture 2a is formed. Numeral 3 denotes a tray constituting a disc supporting member, which has a circular concave portion 3a formed therein within which a recording disc 11 is supported. A central aperture 11a is formed in recording disc 11, concentric with the center of rotation of the disc. A sub-panel 9 is formed on one end of tray 3, which fits into the aperture 2a in front panel 2 when tray 3 is moved from an outwardly protruding position thereof (as illustrated in FIG. 1) to an inward position described hereinafter, to thereby close aperture 2a. Numeral 5 denotes a set of push-button switches coupled to a control section (not shown in the drawings) whereby signals are generated to control various operations as described hereinafter. The tray 3 is movable along a substantially horizontal direction extending from front to rear of the housing, as indicated by arrow Y in FIG. 1, while the horizontal direction perpendicular thereto is indicated by arrow X, and the vertical direction by arrow Z.

Figure 2:
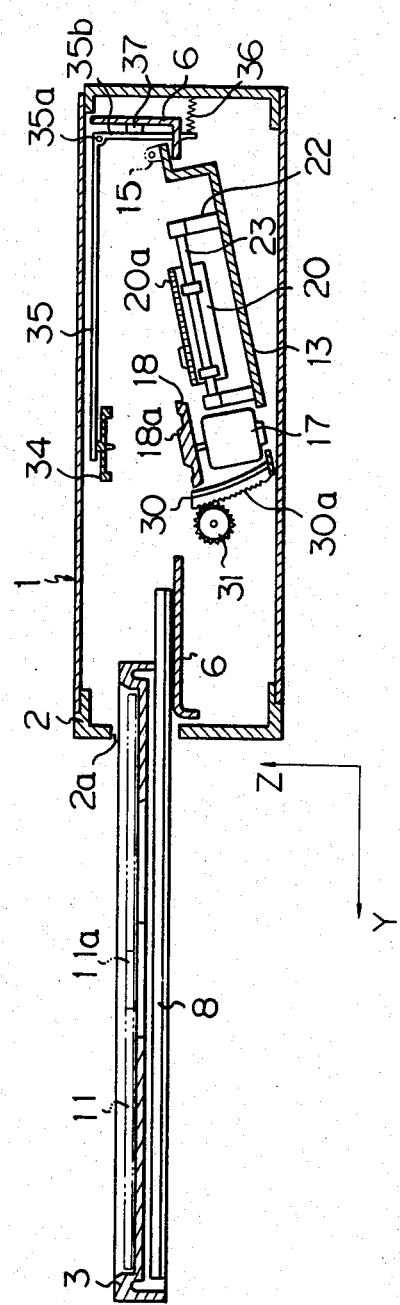
FIG. 2 is a cross-sectinal view in elevation of the embodiment of FIG. 1.
Figure 3:
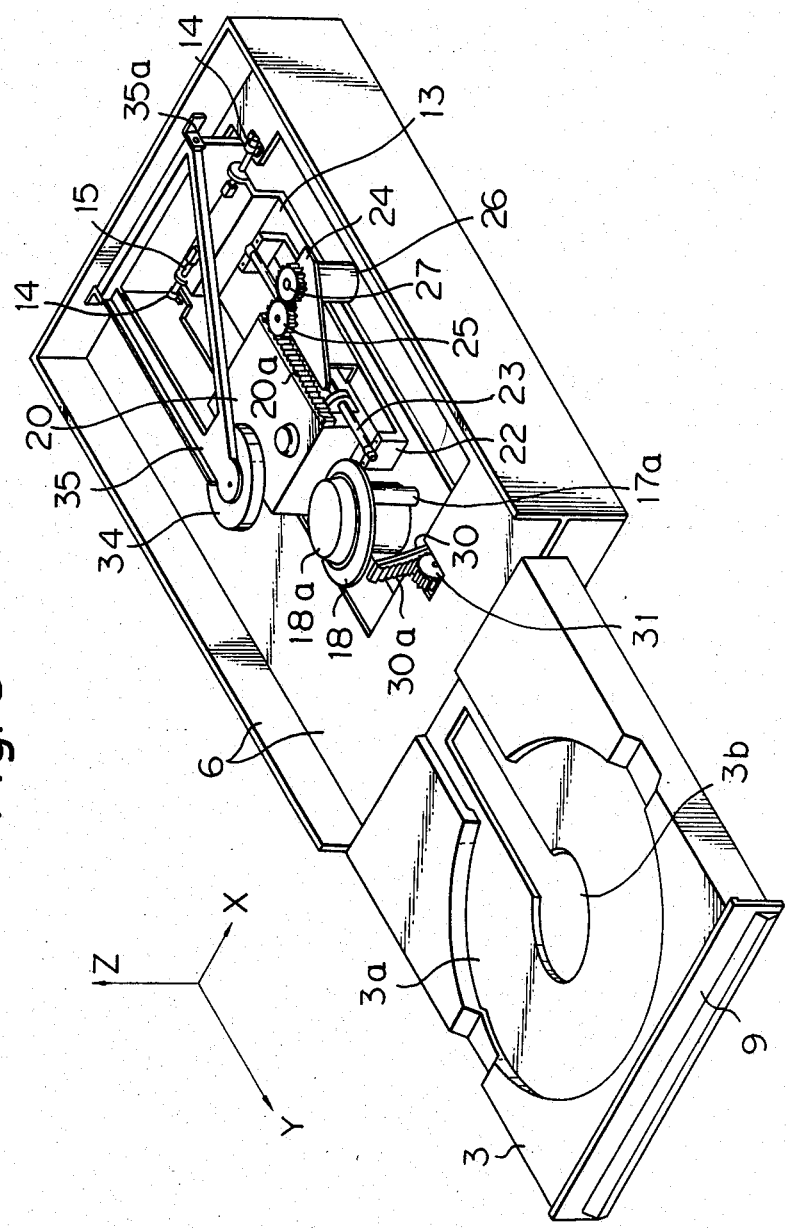
FIG. 3 is an oblique view to illustrate the interior of the front-loading disc player embodiment of FIG. 1.

FIG. 2 shows a cross-sectional side view in elevation (i.e. viewed along the Y axis from a direction opposite to arrow X in FIG. 1) of the embodiment of FIG. 1, while FIG. 3 shows an oblique view of the interior of housing 2. Referring to both those drawings, a disc supporting portion 3a of tray 3 is shaped to accommodate a recording disc 11 on an upper face of that supporting portion. An aperture 3b is formed in tray 3, having a circular portion (concentric with aperture 11a in recording disc 11) and an elongated rectangular portion extending in the front-to-rear direction. Numeral 6 denotes a chassis, which is fixedly mounted in housing 1, may form part of the structure of housing 1 and is provided with side rails and supporting rollers (not shown in the drawings) whereby tray 3 is slidably mounted for movement along the Y direction). Numeral 13 denotes a member, referred to in the following as a swinging member 13, which is pivoted about a shaft 15 which is rotatably supported by bearings 14, mounted on chassis 6.

A turntable 18 is mounted on the drive shaft of a spindle motor 17, with motor 17 being fixedly mounted on swinging member 13. Numeral 18a denotes an engaging portion of turntable 18, which engages with the central aperture 11a of a recording disc 11, when tray 3 is set to the upper position thereof. The drive shaft of a spindle motor 17 rotates turntable 18, which is mounted thereon. Spindle motor 17 is fixedly mounted on chassis 6 by supporting pillar 17a.

In addition, pick-up means are mounted on swinging member 13, comprising a carriage 20 which transports optical means for readout of the recorded contents of a disc and drive means for moving carriage 20 with respect to a disc, i.e. to scan over a surface of the disc. The latter carriage drive means comprise a toothed rack portion 20a which is fixedly attached along one side of carriage 20 extending in the direction of movement of the carriage, a gear wheel 25 which meshes with rack portion 20a and is rotatably mounted on a supporting bracket 24, fixedly mounted on chassis 6, gear wheel 27 which meshes with gear wheel 25, and a motor 26 for driving gear wheel 27. Motor 26 is fixedly mounted on bracket 24. Carriage 20 is slidably mounted on a guide shaft 23, which is fixedly mounted on a supporting stage 22, attached to chassis 6. Guide shaft 23 extends along the same direction as rack portion 20a, so that carriage 20 is driven back or forth along that direction by rotation of gear wheel 27 by motor 26.

Spindle motor 17, turntable 18, rack portion 20a, carriage 20 with optical pick-up means mounted thereon, supporting stage 22, guide shaft 23, supporting bracket 24, gear wheels 25, 27, and motor 26, together with any peripheral components associated with these constitute playing means for read-out of the contents of a recording disc.

Numeral 30a denotes a toothed gear segment which is formed on a member 30 fixedly attached to swinging member 13, at the opposite end of swinging member 13 to that which is pivoted about shaft 15. A gear wheel 31 engages with gear segment 30a, and is driven by a motor (not shown in the drawings), to swing swinging member 13 about shaft 15 from the downward position shown in FIG. 2 to an upward position. When the latter position is reached, with tray 3 set to the inward position thereof with a recording disc set on supporting portion 3a, then the engaging portion 18a of turntable 18 will become engaged with the central aperture 11a in recording disc 11, which will thereby become supported on turntable 18. More specifically, recording disc 11 will be moved slightly upward by turntable 18, to be separated from the supporting surface of tray 3, and will become clamped between turntable 18 engaging portion 18a and a clamping member 34 described hereinafter.

Clamping member 34 is rotatably mounted on one end of a supporting member 35, as illustrated in FIG. 3. The supporting member 35 is supported at the opposite end by a pivot shaft 35a, mounted in brackets attached to chassis 6. A coil spring 36 is coupled to a portion 35b of supporting member 35, acting thereon in a direction urging clamping member 34 towards turntable 18, while the extent of such movement of clamping member 34 is restricted by a flexible stopper 37, formed of a material such as rubber, which is interposed between portion 35b of supporting member 35 and an upwardly extending portion of chassis 6. With this arrangement, a predetermined amount of force acting to retain a recording disc 11 on turntable 18 is applied by clamping member 34, when swinging member 13 is in the upward position thereof.

Sensing means (not shown in the drawings) are also provided for producing position detection signals to indicate when swinging member 13 has reached the fully lowered and fully upward positions thereof respectively, and also to indicate when tray 3 has reached the fully outward position and fully inward position thereof respectively, and moreover to indicate when carriage 20 has reached the limits of its range of movement. These position detection signals are input to an electronic control section (not shown in the drawings), together with signals generated by actuation of push-button switches 5, to produce control signals to control the operation of the front-loading disc player as described in the following.

It should be noted that the positional relationships shown in FIG. 3 are arranged such as to clearly indicate the configuration of various components of the disc player, and do not accurately represent the actual positional relationships between these components in an assembled disc player (i.e. with swinging member 13 swung to the upward position thereof as shown in FIG. 3, clamping member 34 would actually be in contact with the engaging portion 18a of turntable 18, in the absence of a recording disc 11 interposed between these).

The operation of this embodiment is as follows. Firstly, with tray 3 in the outward position thereof and swinging member 13 set to the downward position thereof, as shown in FIG. 2, a recording disc 11 is placed in supporting portion 3a of tray 3. The tray 3 is then pushed manually inward until a limit position is reached, whereupon tray 3 becomes locked against further movement with respect to the housing, by latch means (not shown in the drawings). A control signal is then applied to motor which drives gear wheel 31, whereby this gear wheel is rotated to swing swinging member 13 upward. This upward movement is continued until engaging portion 18a of turntable 18 has become engaged within aperture 11a of recording disc 11, recording disc 11 has been thereby raised slightly above the surface of supporting portion 3a, and has become clamped between turntable 18 and clamping member 34. A position detection signal is then generated as described above, whereby the control section halts further rotation of the motor driving gear wheel 31. The swinging member 13, with the playing means comprising turntable 18 and the pick-up means described hereinabove mounted thereon, is now in the upward position thereof, and playing of the recording disc 11 by rotation of the disc together with linear movement of carriage 20 can now begin, i.e. in response to actuation of a "play" pushbutton provided in the set of push-button switches 5. When playing of the disc is completed (i.e. as indicated by a position detection signal produced when the limit position of carriage 20 is reached, or an input signal produced by actuation of one of push-button switches 5), then rotation of spindle motor 17 and movement of carriage 20 are halted. The swinging member 13 is now swung downward, to disengage turntable 18 from recording disc 11, and when an "eject" pushbutton provided on front panel 2 is actuated, the latch means referred to above are released, whereby the locked condition of tray 3 is released and the tray is pushed slightly outward so that sub-panel 9 protrudes slightly outward from front panel 2. Tray 3 can now be pulled outward, manually, and disc 11 can then be replaced.

The operation whereby swinging member 13 is swung downward after playing a disc is completed can be performed either by rotation of gear wheel 31 in the opposite direction to that whereby swinging member 13 is swung upward, e.g. by utilizing a motor controllable for bidirectional rotation to drive gear wheel 31, or simply by allowing the weight of swinging member 13 and the components mounted thereon to move the assembly to the lowered position shown in FIG. 2.

It will be understood from the above that with a front-loading disc player according to the present invention, it is only necessary to move a tray 3 along a single direction, i.e. a substantially horizontal front-to-rear direction, so that the overall mechanical configuration of the player can be made very simple. It is an important feature of the present invention that all of the playing means, i.e. the turntable 18 which rotates a recording disc and the pick-up means which read out the disc contents, are mounted upon a common swinging member 13. This enables the relative positions of the turntable 18 and the pick-up means to be established to a very high degree of accuracy, which is essential to proper operation of a digital audio disc player or video disc player. If only the turntable 18 and spindle motor 17 were to be mounted on a swinging member 13, and the pick-up means were to be held mounted on the chassis, then it would not be possible to attain the requisite high degree of relative position accuracy required, without utilizing components which are machined to a very high degree of accuracy, thereby substantially increasing the manufacturing cost of the player.

It should be noted that the embodiment described above could be modified in various ways, e.g. a different arrangement could be employed to move swinging member 13 upward and downward, a different configuration could be utilized for clamping the recording disc onto the turntable, etc. Thus, although the present invention has been described in the above with reference to specific embodiments, various changes to the embodiments may be envisaged, which fall within the scope claimed for the invention as set out in the appended claims. The above specification should therefore be interpreted in a descriptive and not in a limiting sense.

What is claimed is:

1. A front-loading disc player comprising:
    a housing having an aperture formed in a substantially vertically oriented face thereof;
    a disc supporting member having a disc supporting portion formed thereon for supporting a recording disc in a substantially horizontal position, said disc supporting member being slidably mounted with respect to said housing for movement along a substantially horizontal path between an outward position thereof in which said disc supporting member protrudes outward from said housing through said housing aperture and an inward position thereof in which said disc supporting member is substantially entirely contained within said housing;
    a swinging member disposed within said housing, pivoted about one end thereof by pivot means fixedly mounted with respect to said housing for permitting swinging movement of said swinging member between a first and a second position thereof, said first position being higher than said second position;
    drive means coupled to said swinging member, operable to selectively drive said swinging member to said first and second positions thereof;
    a motor-driven turntable formed with a turnable disc supporting portion and rotatably mounted on said swinging member at a position whereby, with said disc supporting member set to said inward position thereof with a recording disc supported thereon, movement of said swinging member from said second position to said first position thereof acts to first bring said turntable disc supporting portion into engagement with the central region of said recording disc and to then move said recording disc from said disc supporting portion of said disc supporting member to become supported on said turntable disc supporting portion, and whereby said turntable is completely disengaged from said recording disc when said swinging member is swung to said second position thereof, and;
    pick-up means for read-out of data recorded on said recording disc, mounted on said swinging member to become positioned adjacent to the recorded data portion of said recording disc supported on said turntable disc supporting portion when said swinging member is swung from said second to said first position thereof.

2. A front-loading disc player according to claim 1, in which said drive means for driving said swinging member comprises:
    a gear segment fixedly mounted on the opposite end of said swinging member relative to said pivoted one end thereof;
    a gear wheel rotatably mounted with respect to said housing, meshing with said gear segment on said swinging member; and,
    a motor having a drive shaft which is coupled to said gear wheel.

3. A front-loading disc player according to claim 1, and further comprising clamping means for clamping a recording disc against said turntable disc supporting portion when said swinging member is swung to said first position thereof and for permitting rotation of said recording disc by said turntable.

4. A front-loading disc player according to claim 3, in which said clamping means comprises:
- a support member which is pivot-mounted in said housing at one end thereof;
- a clamping member rotatably mounted on an opposite end of said support member, said clamping member being positioned directly above said turntable disc supporting portion when said turntable is swung to said first position thereof;
- spring means coupled between said housing and said support member for acting on said support member to urge said clamping member towards said turntable, and;
- a stopper member fixedly mounted in said housing, positioned to limit the extent of movement of said clamping member in the direction urged by said spring means.

5. A front-loading disc player according to claim 1, and further comprising a carriage means which is movably mounted on said swinging member, for supporting and transporting said pick-up means, and a drive means for driving said carriage linearly over a portion of said swinging member.

6. A front-loading disc player according to claim 5, in which said drive means for said carriage comprises a rack gear which is fixedly attached to said carriage, a complementary gear wheel which is meshingly engaged with said rack gear, and a motor which is operable for bidirectional rotation and having a drive shaft coupled to rotate said gear wheel.

7. A front-loading disc player according to claim 5, and further comprising:
- first position sensing means for sensing when said swinging member is set in said first and said second positions thereof and for producing respective first sensing signals indicative of said position settings;
- second position sensing means for sensing when said carriage is set at first and second limit positions within the range of said linear movement thereof, respectively corresponding to commencement and completion of playing said recording disc, and for producing respective second sensing signals indicative of said first and second limit positions of said carriage;
- third position sensing means for sensing when said disc supporting member is set at said inward and outward positions thereof, and for producing respective third sensing signals indicative of said position settings;
- externally actuatable switches, operable to generate at least a command signal designating that the playing of said recording disc mounted on said turntable is to be initiated, and;
- electronic control circuit means responsive to said first, second and third sensing signals respectively from said first, second and third position sensing means for controlling said drive means coupled to said swinging member to:
  - (a) move said swinging member from said first position to said second position thereof when completion of playing a recording disc is indicated by said second sensing signals from said second sensing means;
  - (b) move said swinging member from said second position to said first position when said recording disc has been placed upon said disc supporting portion of said disc supporting member and said disc supporting member has been moved from said outward to said inward position thereof, as indicated by said third sensing signals from said third position sensing means;
- and further for controlling said drive means for said carriage to initiate linear movement of said carriage and controlling the motor of said motor-driven turntable to initiate rotation of said turntable, when said command signal designating playing of said recording disc is generated, and controlling said drive means for said carriage and the motor of said turntable to terminate operation thereof when playing of said recording disc is completed, as indicated by said second sensing signals from said second sensing means.

* * * * *